United States Patent
Farahati et al.

(10) Patent No.: US 9,068,604 B2
(45) Date of Patent: Jun. 30, 2015

(54) FRICTION CLUTCH AND PLATE WITH PARTIALLY RAISED SEGMENT JOINTS

(71) Applicant: Schaeffler Technologies AG & Co. KG, Herzogenaurach (DE)

(72) Inventors: Rashid Farahati, Copley, OH (US); Thomas Freshly, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/070,759

(22) Filed: Nov. 4, 2013

(65) Prior Publication Data

US 2014/0124326 A1    May 8, 2014

Related U.S. Application Data

(60) Provisional application No. 61/722,618, filed on Nov. 5, 2012.

(51) Int. Cl.
*F16D 13/64* (2006.01)
*F16D 69/00* (2006.01)

(52) U.S. Cl.
CPC .............. *F16D 13/64* (2013.01); *F16D 13/648* (2013.01); *F16D 69/00* (2013.01); *F16D 2069/004* (2013.01); *F16D 2250/0023* (2013.01)

(58) Field of Classification Search
USPC ................................. 192/70.11–70.14, 113.3, 192/113.34–113.36
See application file for complete search history.

(56) References Cited

U.S. PATENT DOCUMENTS

| | | | | |
|---|---|---|---|---|
| 3,397,760 | A * | 8/1968 | Robins et al. | 192/107 R |
| 3,422,936 | A * | 1/1969 | Marcheron | 188/218 XL |
| 4,563,386 | A * | 1/1986 | Schwartz | 442/101 |
| 5,092,443 | A * | 3/1992 | Nomura | 192/107 M |
| 5,954,172 | A * | 9/1999 | Mori | 192/3.29 |
| 6,035,991 | A * | 3/2000 | Willwerth et al. | 192/107 R |
| 6,062,367 | A * | 5/2000 | Hirayanagi et al. | 192/107 R |
| 6,585,096 | B2 | 7/2003 | Fujita | |
| 7,165,664 | B2 | 1/2007 | Suzuki et al. | |
| 2002/0043441 | A1* | 4/2002 | Fujita | 192/85 AA |
| 2004/0050646 | A1* | 3/2004 | Matthes et al. | 192/107 R |
| 2004/0074733 | A1* | 4/2004 | Suzuki et al. | 192/107 R |
| 2006/0102443 | A1* | 5/2006 | Kinoshita et al. | 192/70.14 |
| 2008/0199641 | A1* | 8/2008 | Hasegawa et al. | 428/34.1 |

* cited by examiner

*Primary Examiner* — Richard Lorence
*Assistant Examiner* — Lillian Nguyen
(74) *Attorney, Agent, or Firm* — Davidson, Davidson & Kappel, LLC

(57) ABSTRACT

A friction material segment includes a first end and a second end, the first end including an edge having a first section having a reduced thickness and a second section having a second thickness greater than the reduced thickness section. A friction plate with a plurality of friction material segments and a wet-type friction clutch are also provided, as is a method for manufacturing the friction material segment.

17 Claims, 6 Drawing Sheets

FRICTION CLUTCH AND PLATE WITH PARTIALLY RAISED SEGMENT JOINTS

This claims the benefit to U.S. Provisional Patent Application No. 61/722,618, filed on November 5, which is hereby incorporated by reference herein.

The present invention relates to friction clutches and plates, and more particularly to a wet-type friction clutch with a plurality of friction plates, each plate having a segmented friction material. Such friction clutches may be uses for example in motor vehicle transmissions.

BACKGROUND

The friction material in wet-type friction clutches generally operates in an oil submerged environment and is often paper-based material used to form friction material rings. To reduce waste during manufacture, the wet friction material ring may be stamped out in segments and then bonded to the plate to form the friction material rings. However, the edges between the segments can cause premature material failure and reduce the life of the wet friction material. One reason for premature material failure is due in part to the ability of fluid to enter the uncompressed edge of the cut joint.

U.S. Pat. No. 6,585,096 describes a joint with reduced thickness and U.S. Pat. No. 7,165,664 has a depressed flat area at the joint.

SUMMARY OF THE INVENTION

Highly compressing the entire segment at the joint can improve durability, but also can lead to fluid flow between the inner diameter and the outer diameter of the friction material ring and cause some oil leakage during engagements. Moreover, the more surface area that is compressed, the higher the unit pressure on the non-compressed or less compressed areas.

The present invention provides a friction material segment having two ends, at least one of the ends including an edge having a first section having a reduced thickness and a second section having a second thickness greater than the reduced thickness section.

By having an edge with second section with a thickness greater than the reduced thickness section, flow from the inner diameter to the outer diameter can be reduced.

Preferably, the second thickness is the same thickness as a body of the friction material segment between the two ends and uncompressed, and thus the second section can advantageously increase the surface area available for providing friction.

The reduced thickness section preferably is a compressed material section, and the friction material segment preferably is made out of a fibered textile composite friction lining.

The friction material segment preferably is part of an arc of a circle, and the edges preferably are curved, although other end shapes, such as straight or those providing interlocking are possible.

In one embodiment, the second section is located at an outer diameter of the friction material segment, which advantageously can block flow. However, the thicker second section could be located anywhere along the edge, and additional thicker sections could be provided in addition to the second section.

The present invention also provides a friction plate comprising a base and plurality of friction material segments attached to the base to form a friction material ring, the plurality of friction material segments including a first friction material segment having two ends, at least one of the ends including an edge having a first section having a reduced thickness and a second section having a second thickness greater than the reduced thickness section, the plurality of friction material segments further including a second friction material segment contacting the edge of the first friction material segment.

In one embodiment, the second friction material segment has a second edge contacting the first edge, the second edge having a thickness similar to the second thickness along the entire edge. In a second embodiment, the second edge has a reduced thickness opposite the reduced thickness of the first edge, and a thickness similar to the second thickness opposite the second thickness of the first edge.

The number of friction material segments in the ring preferably is at least four or more, and each connection between the segments includes at least one edge with a reduced thickness section and a second section having a second thickness greater than the reduced thickness section.

The present invention also includes a friction clutch comprising at least one friction plate comprising a base and plurality of friction material segments attached to the base to form a friction material ring, the plurality of friction material segments including a first friction material segment having two ends, at least one of the ends including an edge having a first section having a reduced thickness and a second section having a second thickness greater than the reduced thickness section, the plurality of friction material segments further including a second friction material segment contacting the edge of the first friction material segment.

The present invention also includes a method for manufacturing a friction material segment comprising compressing a part of an edge section of a friction material segment while leaving a further part of the edge section at a first thickness or uncompressed or adding material to thicken the compressed part.

BRIEF DESCRIPTION OF THE DRAWINGS

The present invention will be further described in a non-limiting manner on the basis of the drawing of preferred embodiments in which.

DETAILED DESCRIPTION

Figure 1:
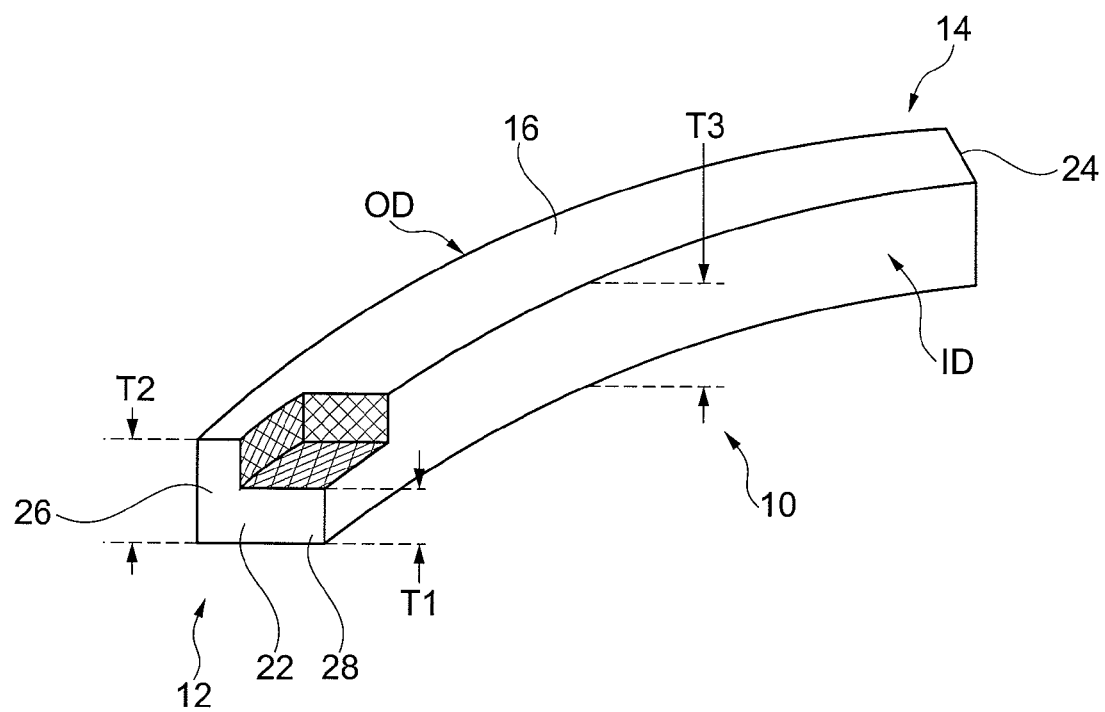
FIG. 1 shows friction material segment according to one embodiment of the present invention.

FIG. 1 shows schematically a friction material segment 10 according to one embodiment of the present invention. Friction material segment 10 has two ends 12, 14. In this embodiment, end 12 has an edge 22 having a first section 28 having a reduced thickness T1 and a second section 26 having a second thickness T2 greater than the first section 28. End 14 has an edge 24 of a single thickness, in this embodiment T2.

A body 16 of the segment 10 between ends 12 and 14 has a thickness T3, which in this embodiment is the same thickness as T2. Both body 16 and the end 12 at second section 26 and end 14 may be made for example of evenly compressed friction material, while the end 12 at first section 28 may be made by highly compressing portions of the friction material, for example by stamping using a die, so that end 12 at first section 28 is made of highly compressed friction material.

The thicker edge section 26 in this embodiment thus can provide friction area to reduce unit pressure for a friction plate, while also aiding in preventing oil seepage between an inner diameter ID and an outer diameter OD.

Figure 2:
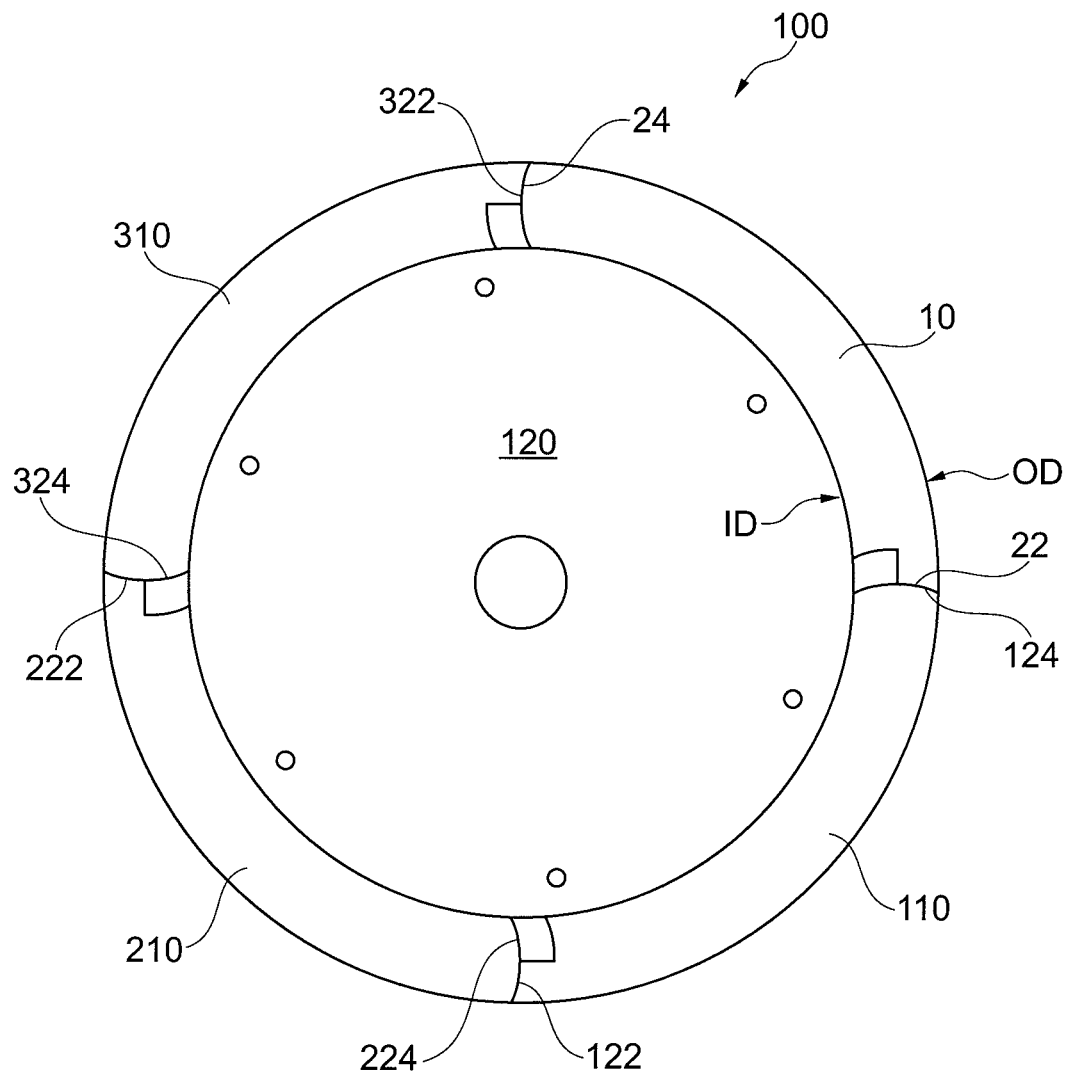
FIG. 2 shows a friction plate comprising four of the segments shown in the embodiment of FIG. 1.

As shown for example in FIG. 2, friction plate 100 comprises a base 120, for example a plate made of metal, and four segments, including segment 10 shown in the embodiment of FIG. 1 and three segments 110, 210, 310 similar to segment 10, so that segments 110, 210, 310 have edges 122, 222, 322, respectively, similar to edge 22 and edges 124, 224, 324, respectively, similar to edge 24. These segments 10, 110, 210, 310 can for example be glued or adhered to base 120 to form a friction ring, with edges 22, 124, edges 122, 224, edges 222, 324 and edges 322, 24 abutting as shown. The edges can be curved to fit together as shown, although other edge shapes are possible such as interlocking edges.

Flow between outer diameter OD and inner diameter ID is thus blocked by or reduced by the thicker sections at second section 26, while the thinner compressed edge sections still improve durability.

Figure 3:
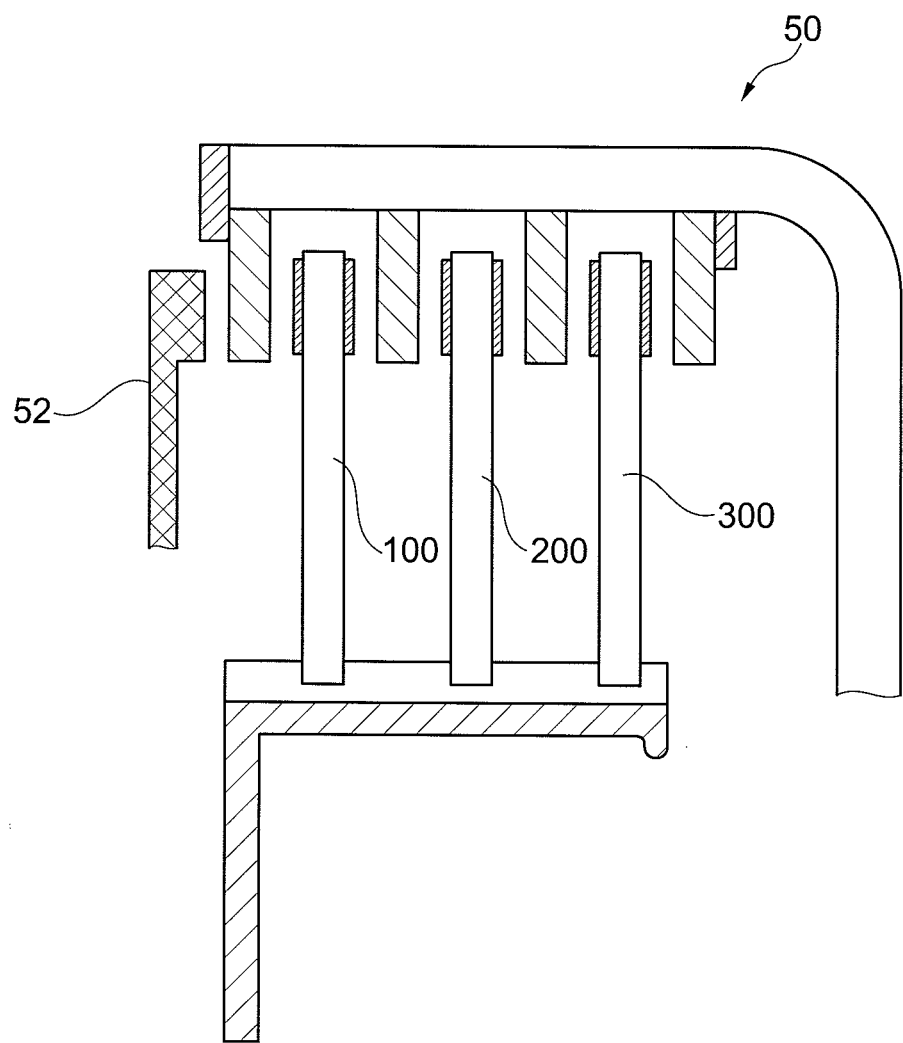
FIG. 3 shows schematically a friction clutch with a plurality of the friction plates shown in FIG. 2.

FIG. 3 shows schematically a wet-type friction clutch 50 of a motor vehicle transmission having a plurality of friction plates 100, 200, 300 all similar to the friction plate 100 of FIG. 2 for example. The axially-movable plates 100, 200, 300 can be pressed against axially-movable separator plates by a piston 52, for example a hydraulically-actuated piston, to provide frictional engagement.

Figure 4:
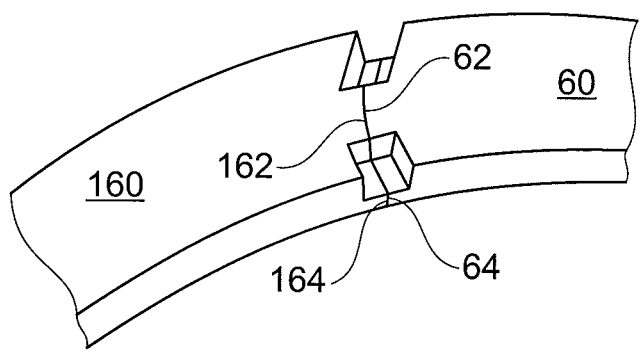
FIG. 4 shows an alternate embodiment of a friction material segment according to a second embodiment of the present invention.

FIG. 4 shows an alternate embodiment of part of a friction material segment 60 according to a second embodiment of the present invention engaging with a similarly designed friction segment 160 at an edge. In this embodiment, the middle section of both edges 62, 162 remains thicker than a highly compressed outer diameter edge section, as well as inner diameter edge sections 64, 164.

Figure 5:
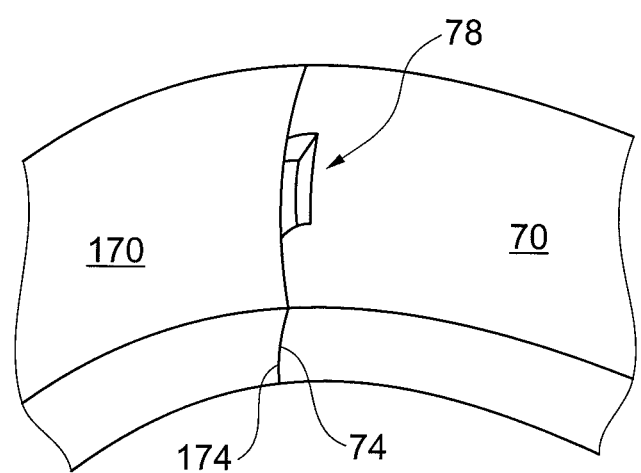
FIG. 5 shows an alternate embodiment of a friction material segment according to a third embodiment of the present invention.

FIG. 5 shows an alternate embodiment of part of a friction material segment 70 according to a third embodiment of the present invention with an edge 74 uncompressed at the inner diameter and outer diameter but having an interior compressed section 78. Edge 74 interacts with another friction material segment 170 having a fully uncompressed edge 174.

Figure 6:
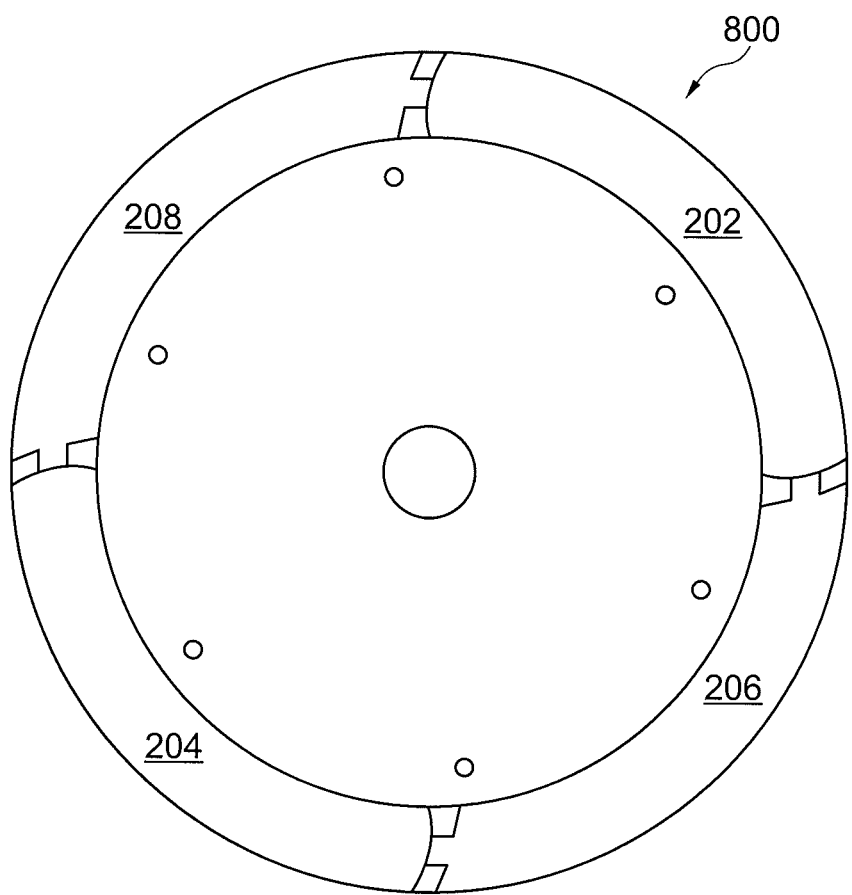
FIG. 6 shows an alternate embodiment of the friction plate according to the present invention.

FIG. 6 shows an alternate embodiment of the friction plate 800 according to the present invention with two friction material segments 202, 204 having uncompressed edges, and two friction material segments 206, 208 with partially compressed edges at the inner diameter and outer diameter, but uncompressed in the middle.

The sections with compressed edge sections can be manufactured by compressing a part of an edge section of a friction material segment while leaving a further part of the edge section uncompressed. For example a die can compress a a fibered textile composite friction lining material of the friction material segment. Alternately, the entire edge could be compressed, and then material added to thicken the compressed part at the edge. While two or more segments may be used to form a ring, preferably at least four are used to form a ring. Other embodiments are within the scope of the claims.

What is claimed is:

1. A friction plate comprising:
a base and a plurality of friction material segments attached to the base to form a friction material ring, a first friction material segment of the plurality of friction material segments including an outer diameter, an inner diameter, a first end, a second end and a body between the two ends, the first end including an edge extending from the inner diameter to the outer diameter, the edge having a first section having a reduced thickness and a second section having a second thickness greater than the reduced thickness section, the body being the second thickness from the inner diameter to the outer diameter, the body, the first section and the second section are made of a first material and the body section and second section are less compressed than the first section to prevent oil seepage between the inner diameter and the outer diameter at the edge.

2. The friction plate as recited in claim 1 wherein the friction material segment is made out of a fibered textile composite friction lining.

3. The friction plate as recited in claim 1 wherein the friction material segment is made out of a fibered textile composite friction lining.

4. The friction plate as recited in claim 1 wherein the segment is arc-shaped.

5. The friction plate as recited in claim 1 wherein the edge is curved between the outer and the inner diameter.

6. The friction plate as recited in claim 1 wherein the second section is located at an outer diameter of the friction material segment.

7. The friction plate as recited in claim 1 wherein the edge includes a third section having a third thickness greater than the reduced thickness.

8. The friction plate as recited in claim 1 wherein the edge includes a third section having a third thickness, the third thickness being less than the second thickness.

9. The friction plate as recited in claim 8 wherein the third thickness is equal to the reduced thickness.

10. The friction plate as recited in claim 1 wherein the second end has a second edge having a thickness greater than the reduced thickness.

11. The friction plate as recited in claim 10 wherein the thickness of the second edge is equal to the second thickness.

12. The friction plate as recited in claim 1 wherein the second end has a second edge having a third section having a third thickness equal to the reduced thickness and a fourth section having a fourth thickness equal to the second thickness.

13. The friction plate as recited in claim 1 wherein a second friction material segment of the plurality of friction ring segments has a second edge contacting the first edge, the second edge having a thickness equal to the second thickness along an entirety of the second edge.

14. The friction plate as recited in claim 1 wherein a second friction material segment of the plurality of friction ring segments has a second edge contacting the first edge, the second edge including a third section having a reduced thickness opposite the reduced thickness of the first edge, the second edge including a fourth section having a thickness equal to the second thickness and opposite the second thickness of the first edge.

15. The friction plate as recited in claim 1 wherein a number of the plurality of friction material segments attached to the base to form the friction material ring is at least four.

16. A wet-type friction clutch comprising:
at least one friction plate as recited in claim 1.

17. The friction plate as recited in claim 1 wherein the first end is the reduced thickness from the first section of the edge to the body.

* * * * *